United States Patent
Amro et al.

(10) Patent No.: US 7,072,939 B1
(45) Date of Patent: Jul. 4, 2006

(54) INSTANT SELECTIVE MULTIPLE SOFT DOCUMENT SHARING BETWEEN MULTIPLE HETEROGENEOUS COMPUTING DEVICES

(75) Inventors: Hatim Yousef Amro, Austin, TX (US); Elizabeth Silvia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,437

(22) Filed: Jan. 27, 2000

(51) Int. Cl.
 *G06F 15/16* (2006.01)
(52) U.S. Cl. ............... 709/204; 709/201; 709/227
(58) Field of Classification Search .......... 709/217, 709/223, 205, 252, 222, 201, 204, 227; 379/88.13; 455/461, 410
See application file for complete search history.

(56) References Cited

U.S. PATENT DOCUMENTS

| | | | | |
|---|---|---|---|---|
| 5,276,703 A * | 1/1994 | Budin et al. | ........... | 375/130 |
| 5,333,312 A | 7/1994 | Wang | ........... | 395/600 |
| 5,594,740 A * | 1/1997 | LaDue | ........... | 455/410 |
| 5,625,809 A | 4/1997 | Dysart et al. | ........... | 395/614 |
| 5,742,905 A * | 4/1998 | Pepe et al. | ........... | 455/461 |
| 5,781,732 A | 7/1998 | Adams | ........... | 395/200.35 |
| 5,790,806 A * | 8/1998 | Koperda | ........... | 709/252 |
| 5,815,508 A * | 9/1998 | Wadzinske et al. | ........... | 714/704 |
| 5,873,031 A * | 2/1999 | Griffith et al. | ........... | 455/432.1 |
| 5,903,548 A * | 5/1999 | Delamater | ........... | 370/310 |
| 5,907,544 A * | 5/1999 | Rypinski | ........... | 370/337 |
| 6,003,068 A * | 12/1999 | Sopko | ........... | 709/205 |
| 6,069,571 A * | 5/2000 | Tell | ........... | 340/870.02 |
| 6,108,314 A * | 8/2000 | Jones et al. | ........... | 370/294 |
| 6,216,158 B1 * | 4/2001 | Luo et al. | ........... | 709/217 |
| 6,223,029 B1 * | 4/2001 | Stenman et al. | ........... | 455/420 |
| 6,226,675 B1 * | 5/2001 | Meltzer et al. | ........... | 709/223 |
| 6,278,706 B1 * | 8/2001 | Gibbs et al. | ........... | 370/352 |
| 6,314,091 B1 * | 11/2001 | LaRowe et al. | ........... | 370/338 |
| 6,411,632 B1 * | 6/2002 | Lindgren et al. | ........... | 370/466 |
| 6,421,325 B1 * | 7/2002 | Kikinis | ........... | 370/280 |
| 6,445,777 B1 * | 9/2002 | Clark | ........... | 379/88.13 |
| 6,462,616 B1 * | 10/2002 | Beswick et al. | ........... | 329/88.03 |

(Continued)

OTHER PUBLICATIONS

Footprint Telepointer; International Business Machines Corporation; Research Disclosure May 1999; pp. 677-678.

(Continued)

*Primary Examiner*—Jeffrey Pwu
*Assistant Examiner*—Phuoc Nguyen
(74) *Attorney, Agent, or Firm*—Duke W. Yee; Mark E. McBurney; Francis Lammes

(57) ABSTRACT

A system and method for providing dynamically shared documents to multiple computing devices. In a preferred embodiment, the system includes a hub and a plurality of computing devices in physical proximity with the hub. Each of the plurality of computing devices communicates with the hub via a wireless connection. The hub acts as a pass-through device receiving and transmitting requests from a requesting computing device to other computing devices and receiving and transmitting answers from the other computing devices to the requesting computing device. Each computing device translates requests and shared documents into a system independent language before transmitting the request of the document to the hub and each computing device translates received documents from the system independent language into a data format preferred by that particular computing device. Thus, documents may be securely shared between computing devices having different operating systems and data formats without having a physical network connection. Furthermore, the hub is portable, thus allowing the sharing of documents at any location in which several users have gathered for a meeting.

28 Claims, 5 Drawing Sheets

U.S. PATENT DOCUMENTS

| | | | | |
|---|---|---|---|---|
| 6,480,580 B1 * | 11/2002 | Beswick et al. | .......... | 379/88.13 |
| 6,490,256 B1 * | 12/2002 | Jones et al. | .................. | 370/277 |
| 6,564,056 B1 * | 5/2003 | Fitzgerald | ................. | 455/435.1 |
| 6,600,726 B1 * | 7/2003 | Nevo et al. | .................. | 370/278 |
| 6,618,763 B1 * | 9/2003 | Steinberg | .................... | 709/246 |
| 6,678,518 B1 * | 1/2004 | Eerola | ........................ | 709/227 |
| 6,680,923 B1 * | 1/2004 | Leon | ........................... | 370/328 |

OTHER PUBLICATIONS

Intelligent Object-Oriented Scenario Generation; International Business Machines Corporation; IBM Technical Disclosure Bulletin vol. 38, No. 12, Dec. 1995; pp. 293-298.

* cited by examiner

INSTANT SELECTIVE MULTIPLE SOFT DOCUMENT SHARING BETWEEN MULTIPLE HETEROGENEOUS COMPUTING DEVICES

BACKGROUND OF THE INVENTION

1. Technical Field

The present invention relates generally to the field of computer software and, more particularly, to methods and systems for soft document sharing.

2. Description of Related Art

Current computing applications are largely single user systems. For example, conventional editing applications allow a single user to open a file and make modifications to the content. If while the file is open by a first user, a second user attempts to open the file, the second user will be prevented from opening or modifying the file. The second user is sometimes permitted to obtain a snapshot copy of the file. The snapshot copy, however, is not updated with any of the subsequent modifications made to the original copy by the first user. Thus, the second user is unable to share in the first user's ideas manifested as file modifications. Moreover, the second user is prevented from modifying the content of the original file and, thus, is prevented from sharing his or her ideas manifested as file modifications. In short, the first and second user are unable to collaboratively edit the file.

Collaboration, as the term is used herein, implies an ability for multiple clients to share ideas. This sharing includes the ability to automatically express one's ideas to the other members without having to have the other members explicitly solicit the ideas. Collaboration also includes the ability for each member to automatically receive any ideas from members who are transmitting ideas. Thus, at a minimum, collaboration implies communication among members that are party to the collaborative effort. This communication/collaboration may follow many models. A "brain-storming" session is an unrestrained model of collaboration. On the other hand, a "round-robin" model, in which each member has a specified turn to express ideas, is a constrained model of collaboration.

To fill this need for collaboration, collaborative software tools have been written that provide a shared document framework that allow documents to be collaboratively accessed by multiple users in a collaborative session. The shared document framework typically provides a mechanism for each collaborator to obtain a replicated copy of the shared document from a network server into the collaborator's local address space, which copy is in synchronism with all other replicated copies of the shared document. Such a system works fine for traditional desktop personal computers connected to a physical network. However, such a model does not work as well for computing devices such as; for example, personal digital assistants that do not have a physical network.

Personal digital assistants (PDAs) and similar computing devices are increasingly used by users to create and maintain schedules of meetings, notes, charts, lists, and other items that the user may need with them at all times. Because of the portable nature of these machines, they provide a convenient way for users to maintain access to these items without being tied to an office. Many of these documents are, despite their portable nature, documents for which collaborative involvement is sometimes needed. For example, during a meeting, many users may need to access and modify a document simultaneously in order to create a presentation. The collaboration of several individuals working on a single document simultaneously may result in a presentation that is markedly superior to one created by a single individual or even by multiple individuals working on the document at separate times. However, currently, PDAs and similar devices do not have the functionality necessary to provide collaborative sharing of documents. Therefore, a method and system of allowing users of PDAs and other portable computing devices that lack a connection to a physical network to collaborate with each other through shared access to soft documents is desirable. Furthermore, a method and system of allowing devices utilizing different operating systems to share documents with each other in a secure environment is also desirable.

SUMMARY OF THE INVENTION

The present invention provides a system and method for providing dynamically shared documents to multiple computing devices. In a preferred embodiment, the system includes a hub and a plurality of computing devices in physical proximity with the hub. Each of the plurality of computing devices communicates with the hub via a wireless connection. The hub acts as a pass-through device receiving and transmitting requests from a requesting computing device to other computing devices and receiving and transmitting answers from the other computing devices to the requesting computing device. Each computing device translates requests and shared documents into a system independent language before transmitting the request of the document to the hub and each computing device translates received documents from the system independent language into a data format preferred by that particular computing device. Thus, documents may be securely shared between heterogeneous computing devices (HCDs), which are computing devices having different operating systems and data formats, without having a physical network connection. Furthermore, the hub is portable, thus allowing the sharing of documents at any location in which several users have gathered for a meeting.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
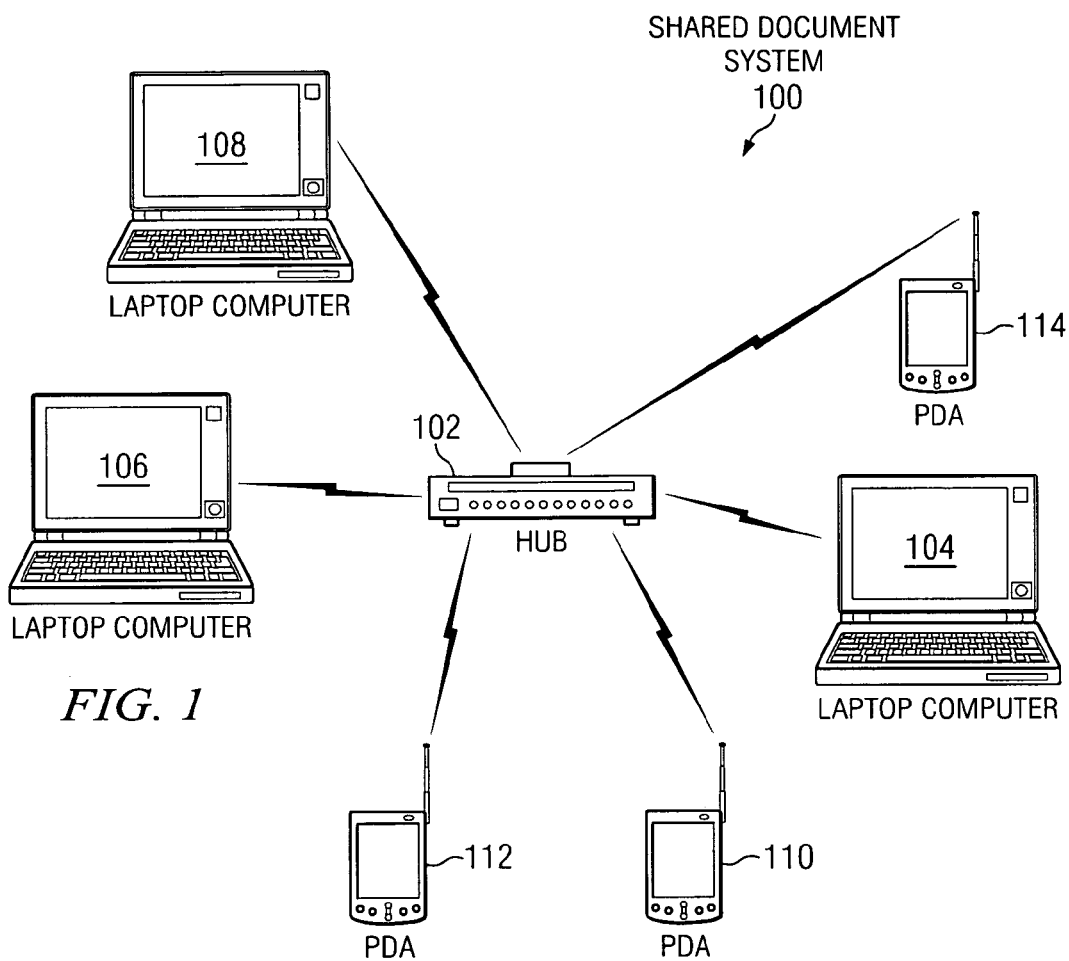
FIG. 1 depicts a pictorial diagram illustrating a document sharing system 100 for portable computing devices in accordance with a preferred embodiment of the present invention.

With reference now to the figures, and in particular with reference to FIG. 1, a pictorial diagram illustrating a document sharing system 100 for portable computing devices is depicted in accordance with a preferred embodiment of the present invention. Document sharing system 100 includes a hub 102, laptop computers 104, 106, and 108, and personal digital assistants (PDAs) 110, 112, and 114.

Hub 102 is a portable device that can be carried with a user to any location to facilitate sharing of soft documents between multiple computing devices. Once hub 102 is turned on, it polls the area in which it is located to determine if there is another hub present. If there is another hub present, then hub 102 presents the user with an error indication through, for example, an LED display or through creation of a sound indicating that another hub is present. Once the error indication has been presented to the user, hub 102 then powers down. Alternatively, if hub 102 determines that one or more other hubs are present in the vicinity, hub 102 can collaborate with the other hubs to provide document sharing to the computing devices present in the vicinity.

Once hub 102 has been powered up and determined that there are no other hubs in the vicinity, then hub 102 creates a list of computing devices that are present in the vicinity. As each portable computing device comes into proximity with hub 102, it will initiate contact with hub 102 to indicate its presence such that hub 102 can add it to the list of computing devices present in the vicinity.

Hub 102, each of laptop computers 104, 106, and 108 and each of PDAs 110, 112, and 114 is equipped with a wireless receiver and transmitter for facilitating communications between the computing devices and hub 102. Preferably, the wireless receiver and transmitter is an infrared receiver and transmitter. However, alternatively, the wireless receiver and transmitter could be any type of wireless receiver and transmitter, such as, for example, a radio frequency (RF) receiver and transmitter. If a wireless receiver and transmitter other than an infrared wireless receiver and transmitter is utilized, the transmission power for the transmitter may need to be limited such that the signals transmitted between the computing devices and hub 102 may not be received and interpreted by devices that are not in the local vicinity of hub 102 to prevent an unauthorized user from intercepting and reading the exchanged documents.

Optionally, as an added security feature in order to prevent unauthorized access to shared documents, data transmission between the computing devices 104, 106, 108, 110, 112, and 114 may be encrypted. Methods of encrypting and decrypting data are well known in the art.

When a user of a computing device, such as PDA 110, that has registered with hub 102 desires to retrieve a document from another computing device, such as laptop computer 108, that is registered with hub 102, the requesting computing device sends a request for the document to hub 102. The request is sent in a commonly understood data format. Hub 102 then retransmits the request to laptop computer 108. Laptop computer 108 then retrieves the requested document and translates it into the commonly understood file format and sends the document to hub 102. Hub 102 retransmits the requested document to the requesting computing device, PDA 110, which then translates the document from the commonly understood data format into the preferred file format of PDA 110.

Because each computing device translates requests and documents into a commonly understood language before broadcasting the request or document, documents may be shared between heterogeneous computing devices (HCDs) which are computing devices that may be running different operating systems and utilizing different data file formats. For example, laptop computer 108 may be running Microsoft Windows 98 operating system, laptop computer 106 may be running IBM's OS/2 operating system, laptop computer 104 may be running Apple's System 7 operating system, and PDAs 110, 112, and 114 may be running 3Com's Palm OS operating system. Yet, because each device includes a translator to translate requests and documents into and out of a commonly understood language, documents created on one machine may be shared with other types of machines.

Users of each registered computing device may control access to documents on their respective machines by designating certain documents as "shared" and allowing others access to only these "shared" documents.

Hub 102 does not store or modify the requests or the documents it receives, but merely acts as a pass-through device that retransmits any requests or documents such that the appropriate party may receive the request or document. By utilizing hub 102, a computing device is able to communicate with more than one other computing device without having to reorient the device to aim it at the next computing device with which it wishes to communicate.

Those of ordinary skill in the art will appreciate that the hardware in FIG. 1 may vary depending on the implementation. For example, more, fewer, or different types of computing devices may be included without departing from the scope and spirit of the present invention. Furthermore, the depicted example is not meant to imply architectural limitations with respect to the present invention.

Figure 2:
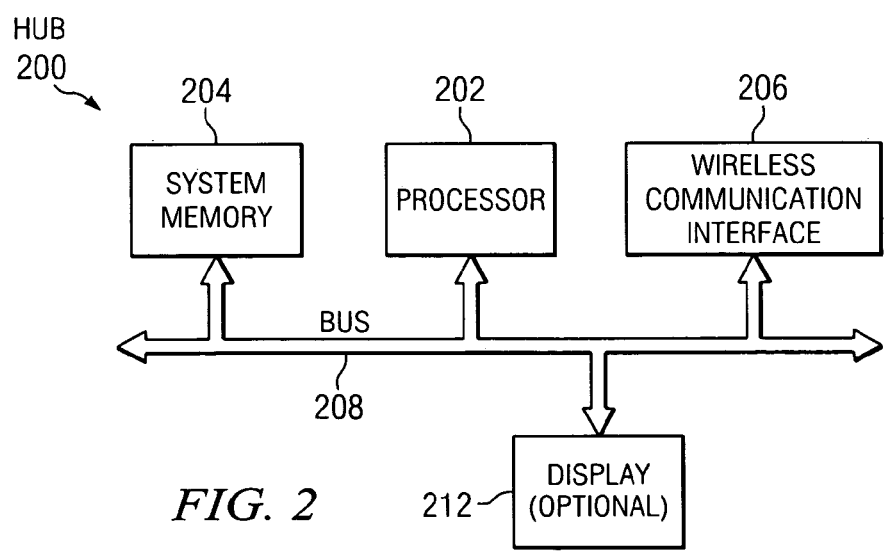
FIG. 2 depicts a block diagram of a hub in which the present invention may be implemented.

With reference to FIG. 2, a block diagram of a hub in which the present invention may be implemented is illustrated. Hub 200 is an example of a hub, such as hub 102 in FIG. 1, for facilitating secure wireless sharing of documents between computing devices running different operating systems and utilizing different document formats.

Hub 200 includes a system memory 204, a processor 202, a wireless communication interface 206, and a bus 208. Optionally, hub 200 may also include a display 212. Display 212, if included, allows hub 200 to indicate error and status messages to users.

System memory 204 is used to store a list of computing devices that have registered with hub 200 to share documents with other computing devices. Wireless communication interface 206 is used to facilitate reception and transmission of requests and documents to and from registered computing devices. Hub 200 does not store or alter requests for documents or the documents it receives from a computing device. Hub 200 merely retransmits the request or the document such that the appropriate computing device may receive the request or document.

Those of ordinary skill in the art will appreciate that the hardware in FIG. 2 may vary depending on the implementation and that the depicted example is not meant to imply architectural limitations with respect to the present invention.

Figure 3:
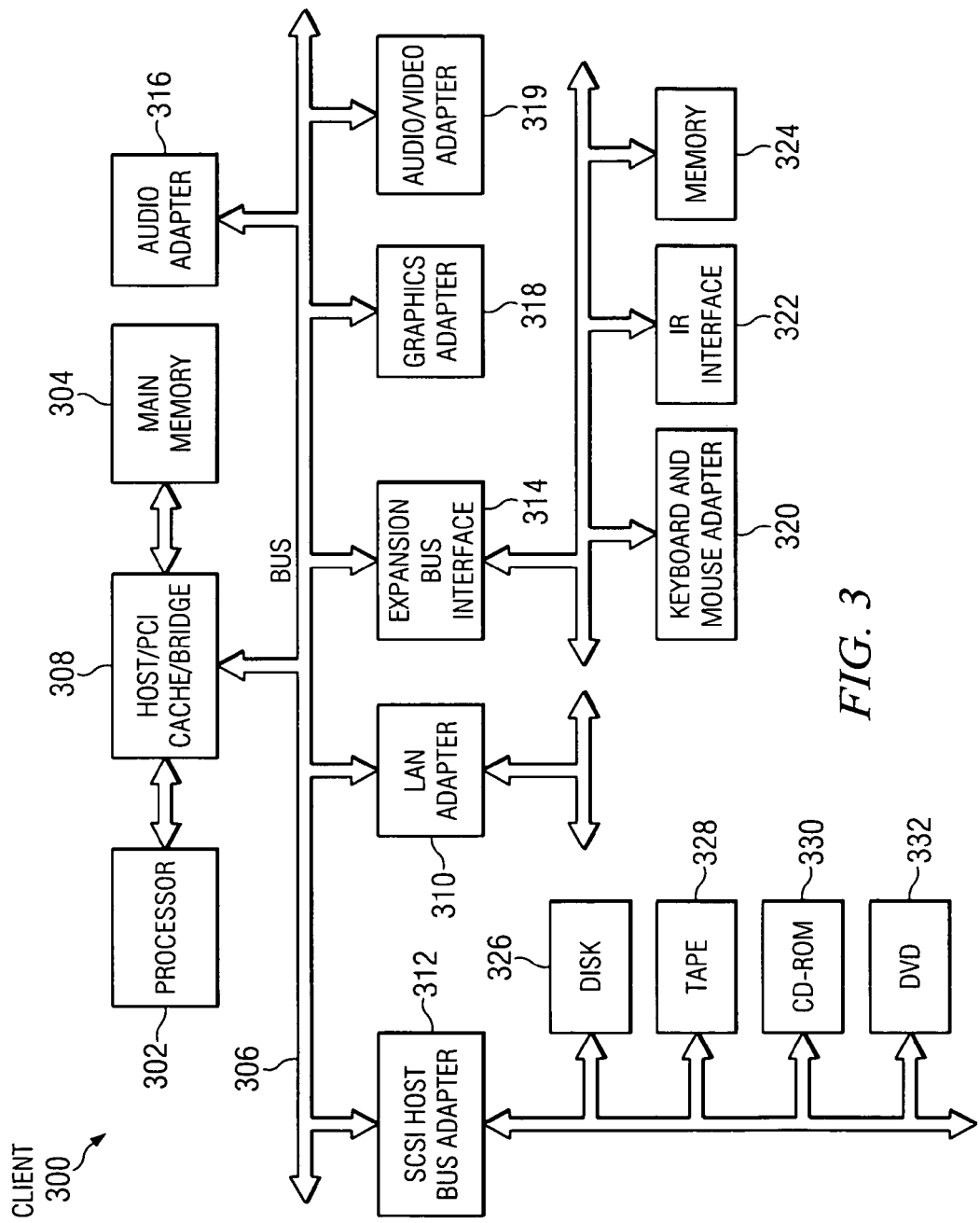
FIG. 3 depicts a block diagram of a data processing system in which the present invention may be implemented.

With reference now to FIG. 3, a block diagram of a data processing system in which the present invention may be implemented is illustrated. Data processing system 300 is an example of a laptop computer, such as, for example, any one of laptop computers 104, 106, or 108. Data processing system 300 may be, for example, an IBM Thinkpad notebook computer running a PCI application. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, Infrared (IR) interface 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

IR interface 322 provides a channel for information to be sent from data processing system 300 to an IR transmitter to be transmitted to hub 102 and also provides a channel for information to be received by data processing system 300 from hub 102 via an IR receiver. Communication between data processing system 300 and hub 102 may use, for example, an Infrared Data Association (IrDA) Infrared Communications Protocol (IrCOMM). When data processing system 300 requests a document from another computing device that has established a session with hub 102, data processing system 300 translates its request into a system independent language or commonly understood file format utilized by hub 102. The system independent language may be, for example, Java or Extensible Markup Language (XML). Once the document has been translated into a system independent language, data processing system 300 sends the translated request to hub 102 via an IR signal emitted from IR interface 322. When data processing system 300 receives the requested document from hub 102 via IR interface 322, the requested document is translated from the system independent language into the format preferred by data processing system 300. If data processing system 300 receives a request for a document from hub 102, data processing system 300 retrieves the document and translates the document into the system independent language utilized by hub 102 and sends the translated document to hub 102 via an IR link.

Those of ordinary skill in the art will appreciate that the hardware in FIG. 3 may vary depending on the implementation. For example, other peripheral devices, such as optical disk drives, modems, and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
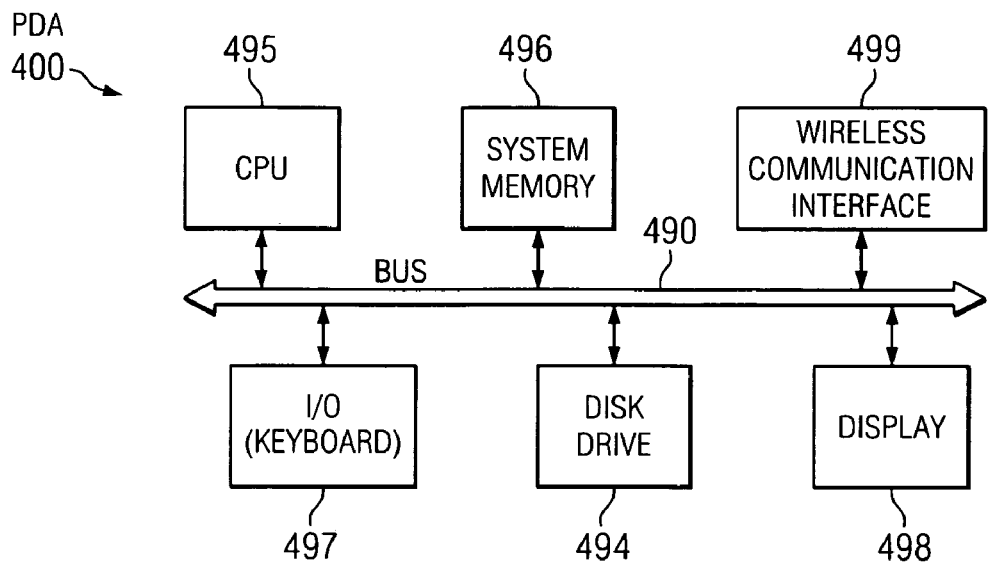
FIG. 4 depicts a block diagram of an exemplary personal digital assistant in accordance with a preferred embodiment of the present invention.

Turning now to FIG. 4, a block diagram of an exemplary personal digital assistant 400 is depicted in accordance with a preferred embodiment of the present invention. Personal digital assistant (PDA) 400 may be implemented as any one of PDAs 110, 112, or 114 depicted in FIG. 1. Communication between PDA 400 and hub 102 use, for example, Infrared Data Association (IrDA) Infrared Communications Protocol 1.0 (IrCOMM 1.0). PDA 400 is preferably a palm top computer having a wireless network interface. PDA 400 may be, for example, a Palm VII Palm Pilot from 3Com. PDA 400 has a central processing unit 495 connected to a bus 490. Central processing unit ("CPU") 495 performs most of the computing and logic functions of PDA 400. A memory 496 is connected to bus 490, which stores information to be provided to CPU 495 or otherwise used by PDA 400. An input/output device 497, such as a keyboard, is also connected to bus 490 which allows a user to input data for storage in memory 496 or for use by CPU 495. A display 498 is connected to bus 490. PDA 400 also has a wireless communication interface 499 for communication with hub 102. Wireless communication interface 499 may utilize, for example, an infrared or radio frequency transmitter and receiver.

An operating system runs on CPU 495 and is used to coordinate and provide control of various components within PDA 400 in FIG. 4. The operating system may be a commercially available operating system, such as the Palm OS operating system available from 3Com Corporation. An object oriented programming system, such as Java, may run in conjunction with the operating system, providing calls to the operating system from Java programs or applications executing on data processing system 400. Instructions for the operating system, the object-oriented operating system, and applications or programs are located on a storage device, such as hard disk drive 494, and may be loaded into system memory 496 for execution by CPU 495.

When PDA 400 requests a document from another computing device that has established a session with hub 102, PDA 400 translates its request into a system independent language or commonly understood file format utilized by hub 102. The system independent language may be, for example, Java or Extensible Markup Language (XML). Once the document has been translated into a system independent language, PDA 400 sends the translated request to hub 102 via an IR signal emitted from wireless communication interface 499. When PDA 400 receives the requested document from hub 102 via wireless communication interface 499, the requested document is translated from the system independent language into the format preferred by PDA 400. If PDA 400 receives a request for a document from hub 102, PDA 400 retrieves the document and translates the document into the system independent language utilized by hub 102 and sends the translated document to hub 102 via an IR link.

It should be noted that translation of documents between different data formats is well known in the art.

Those of ordinary skill in the art will appreciate that the hardware in FIG. 4 may vary depending on the implementation. For example, other devices may be used in addition to or in place of the hardware depicted in FIG. 4. The depicted example is not meant to imply architectural limitations with respect to the present invention.

Figure 5:
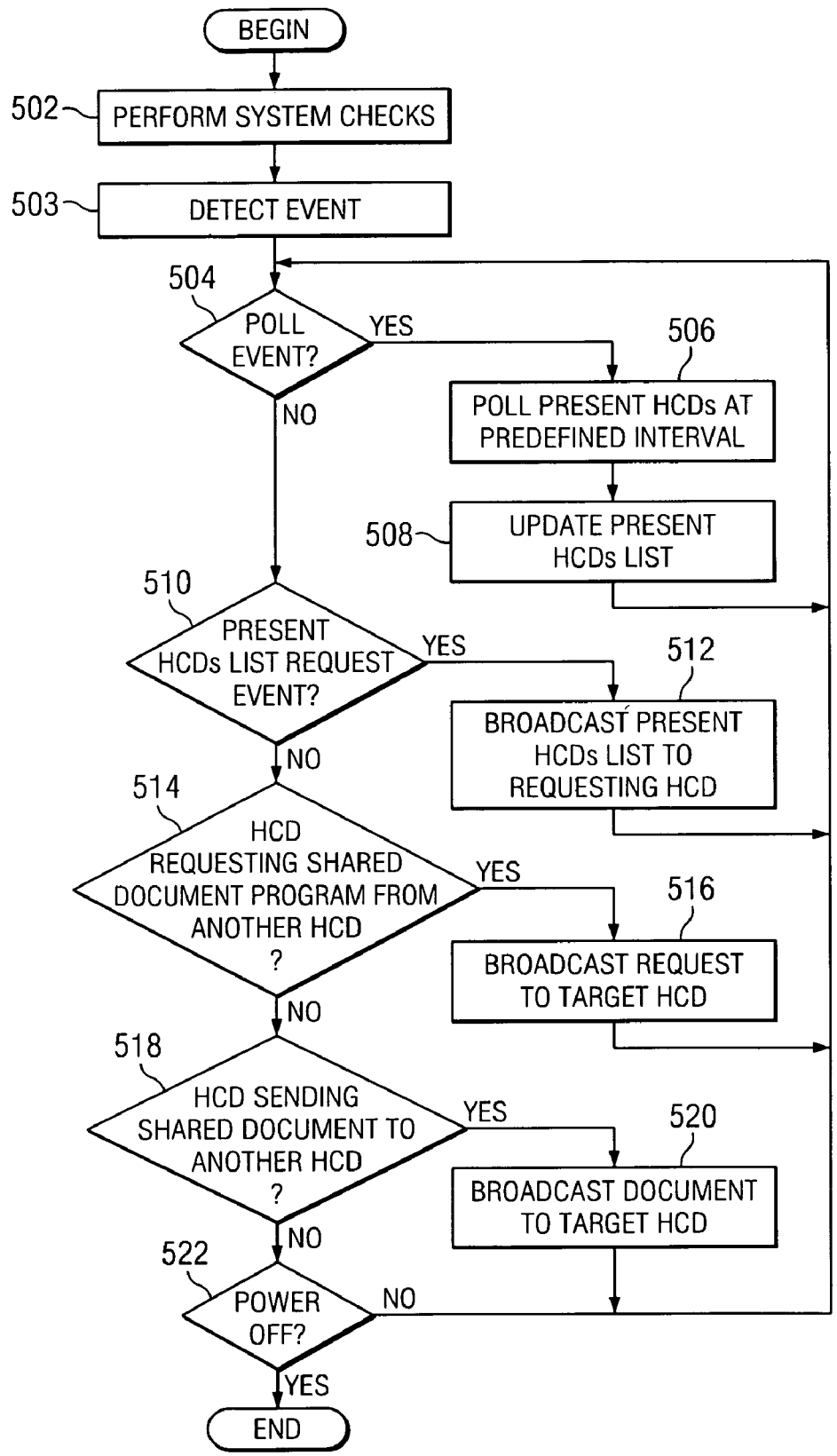
FIG. 5 depicts a flowchart illustrating the processes of the present invention performed on a hub.

Referring now to FIG. 5, a flowchart illustrating the processes of the present invention performed on a hub is depicted. Once the hub is powered up, it performs system checks (step 502) which include polling the immediate vicinity to determine if any other hubs are present. If not, then it determines if the next event is a poll a heterogeneous computing device (HCD) event (step 504). If the event is a poll HCD event, then the hub polls present HCDs at a predetermined interval to determine the identities of all HCDs present in the vicinity of the hub (step 506). The list of present HCDs is updated (step 508) and the hub waits for the next event (step 503).

If the event is not a poll HCD event, then the hub determines whether the event is request to retrieve a list of present HCDs (step 510). If the event is a list of present HCDs, then the hub broadcasts the list of present HCDs to the requesting HCD (step 512) and then waits for the next event (step 503).

If the event is not a request for a list of present HCDs, then the hub determines if the event is an HCD requesting a shared document program from another HCD (step 514). If the event is a request for a shared document, then the hub broadcasts the request to the target HCD (step 516) and then waits for the next event (step 503).

If the event is not a request for a shared document, then the hub determines if the event is an HCD sending a shared document to another HCD (step 518). If the event is an HCD sending a shared document to another HCD, then the hub broadcasts the shared document to the target HCD (step 520) and then waits for the next event (step 503).

If the event is not an HCD sending a shared document to another HCD, the hub determines if the event is a power off event (step 522). If the event is not a power off event, the hub waits for the next event (step 503). If the event is a power off event, then the hub powers down (step 522).

Figure 6B:
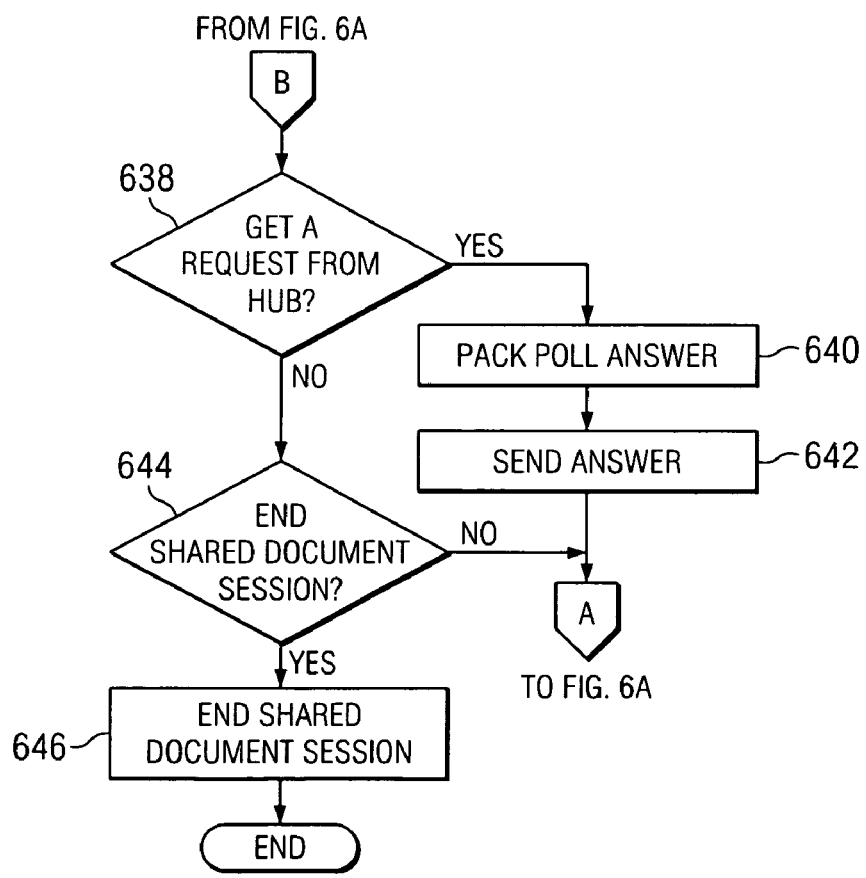
FIGS. 6A and 6B depict a flowchart illustrating a method of sending a request for and receiving a document from another HCD in accordance with the present invention.
Figure 6A:
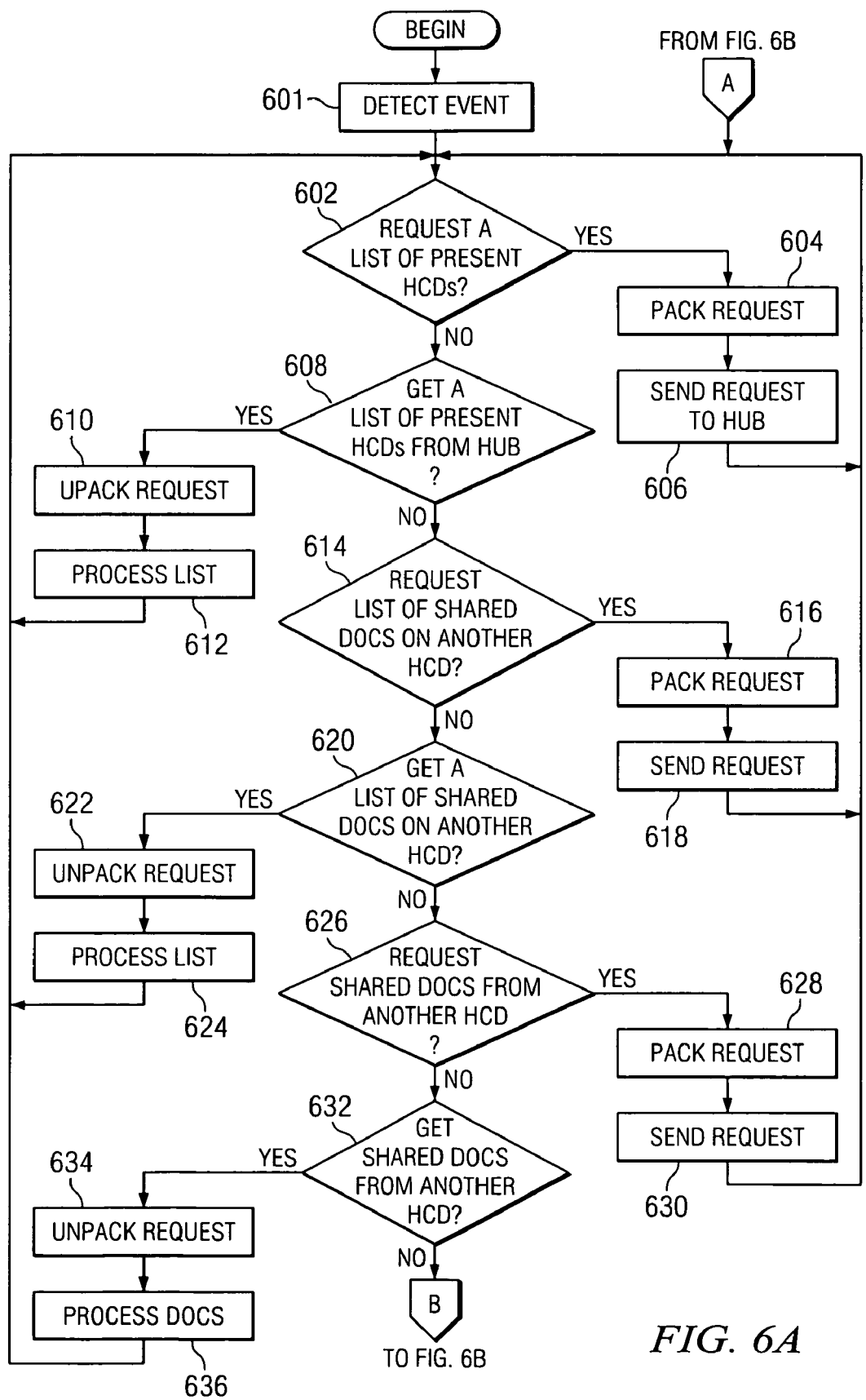

Referring now to FIGS. 6A and 6B, a flowchart is depicted illustrating the processes of the present invention performed on a hub. To begin, the HCD receives an event (step 601). Next, the HCD determines if the event is a request for a list of present HCDs from the hub (step 602). If the event is a request for a list of present HCDs, then the HCD packs the request (step 604) and sends the request to the hub (step 606). The HCD then waits for the next event (step 601).

If the event is not a request for a list of present HCDs, then the HCD determines if the event is receipt of a list of present HCDs from the hub (step 608). If the event is a receipt of list of present HCDs from the hub, then the HCD unpacks the request (step 610), processes the list (step 612), and waits for the next event step 601).

If the event is not a receipt of a list of present HCDs from the hub, then the HCD determines if the request is a list of shared documents present on another HCD (step 614). If the event is a request for a list of shared documents present on another HCD, then the HCD packs the request in a system independent language (step 616) and sends the request to the hub (step 618). The HCD then waits for the next event (step 601).

If the event is not a request for a list of shared documents present no another HCD, then the HCD determines if the event is a list of shared documents on another HCD received from the hub (step 620). If the event is a list of shared documents present on another HCD received from the hub, then the HCD unpacks the request from the system independent language into a language preferred by the HCD (step 622) and then processes the list (step 624). The HCD then waits for the next event (step 601).

If the event is not a list of shared documents on another HCD received from the hub, then the HCD determines if the event is a request of a shared document from another HCD (step 626). If the event is a request of a shared document from another HCD, then the HCD packs the request in a system independent language (step 628) and sends the request to the hub (step 630). The HCD then waits for the next event.

If the event is not a request for a shared document from another HCD, then the HCD determines if the event is a shared document from another HCD received from the hub (step 632). If the event is a shared document from another HCD received by the present HCD from the hub, then the present HCD unpacks the shared document from the system independent language and translates the document into a language preferred by the present HCD (step 634). The HCD then processes the shared document according to the wishes of a user (step 636) and then waits for the next event (step 601).

If the event is not a shared document received from the hub, then the HCD determines if the event is a request by another HCD for information from the present HCD (step 638). If the event is a request from another HCD, then the present HCD packs the answer in a system independent language (step 640) and sends the answer to the hub (step 642). The request may be for a list of shared documents present on the present HCD or for one of the shared documents present on the HCD. The HCD then waits for the next event (step 601).

If the event is not a request by another HCD, then the HCD determines if the event is an end shared document session event (step 644). If the event is an end shared document session event, then the session the HCDs participation in the session is terminated (step 646). Otherwise, the HCD waits for the next event (step 601).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for providing dynamically shared documents, comprising:

a hub, wherein the hub is not connected to any external network; and a plurality of computing devices in physical proximity with the hub; wherein each of the plurality of computing devices communicates with the hub via only a wireless connection;

the hub receives and retransmits requested documents between selected computing devices of the plurality of computing devices, wherein transmissions between each of the plurality of computing devices and the hub are at least one of infrared transmissions or radio frequency transmissions;

each of the plurality of computing devices translates each requested document into a system independent language prior to transmitting the requested document to the hub, wherein the system independent language is at least one of a Java based language or an extensible markup language; and each of the plurality of computing devices translates each received document from the hub.

2. The system as recited in claim 1, wherein the hub is portable.

3. The system as recited in claim 1, wherein at least one of the plurality of computing devices is a personal digital assistant.

4. The system as recited in claim 1, wherein at least one of the plurality of computing devices is a laptop computer.

5. The system as recited in claim 1, wherein at least one of the plurality of computing devices is portable.

6. The system as recited in claim 1, wherein the transmissions between each of the plurality of computing devices and the hub are encrypted.

7. The system as recited in claim 1, wherein the hub is a wireless hub which communicates with computing devices via only wireless communication links.

8. A method in a data processing system for retrieving documents from other data processing systems, comprising the steps of:

sending, from a first data processing system, a request, in a system independent language, for a shared document from a second data processing system to a hub in close proximity to the first and second data processing systems via only a wireless communication signal, wherein the hub is not connected to any external network, wherein the system independent language is at least one of a Java based language or an extensible markup language;

receiving, from the hub, via only the wireless communication link, the shared document, formatted in the system independent language, wherein transmissions between each of the data processing systems and the hub are at least one of infrared transmissions or radio frequency transmissions; and translating the shared document from the system independent language into a first data processing system preferred data format for presentation to a user.

9. The method as recited in claim 8, wherein the strength of the wireless communication signal is such that only devices in close proximity with each other may receive the signal, thus ensuring that only authorized recipients receive information conveyed via the wireless communication signal.

10. The method as recited in claim 8, wherein the hub is portable.

11. The method recited in claim 8, wherein at least one of the data processing systems is portable.

12. The method recited in claim 8, wherein the transmissions between each of the data processing systems and the hub are encrypted.

13. A computer program product in computer readable media for use in a data processing system for retrieving documents from other data processing systems, the computer program product comprising:

first instructions for sending, from a first data processing system, a request, in a system independent language, for a shared document from a second data processing system to a hub in close proximity to the first and second data processing systems via only a wireless communication signal, wherein the hub is not connected to any external network, wherein the system independent language is at least one of a Java based language or an extensible markup language;

second instructions for receiving, from the hub, via only the wireless communication link, the shared document, formatted in the system independent language, wherein transmissions between each of the data processing systems and the hub are at least one of infrared transmissions or radio frequency transmissions; and third instructions for translating the shared document from the system independent language into a first data processing system preferred data format for presentation to a user.

14. The computer program product as recited in claim 13, wherein the strength of the wireless communication signal is such that only devices in close proximity with each other may receive the signal, thus ensuring that only authorized recipients receive information conveyed via the wireless communication signal.

15. The computer program product as recited in claim 13, wherein the hub is portable.

16. The computer program product recited in claim 13, wherein at least one of the data processing systems is portable.

17. The computer program product recited in claim 13, wherein the transmissions between each of the data processing systems and the hub are encrypted.

18. A system for retrieving documents from other data processing systems, comprising:

means for sending, from a first data processing system, a request, in a system independent language, for a shared document from a second data processing system to a hub in close proximity to the first and second data processing systems via only a wireless communication signal, wherein the hub is not connected to any external network, wherein the system independent language is at least one of a Java based language or an extensible markup language;

means for receiving, from the hub, via only the wireless communication link, the shared document, formatted in the system independent language, wherein transmissions between each of the data processing systems and the hub are at least one of infrared transmissions or radio frequency transmissions; and means for translating the shared document from the system independent language into a first data processing system preferred data format for presentation to a user.

19. The system as recited in claim 18, wherein the strength of the wireless communication signal is such that only devices in close proximity with each other may receive the signal, thus ensuring that only authorized recipients receive information conveyed via the wireless communication signal.

20. The system as recited in claim 18, wherein the hub is portable.

21. The system recited in claim 18, wherein at least one of the data processing systems is portable.

22. The system recited in claim 18, wherein the transmissions between each of the data processing systems and the hub are encrypted.

23. A method in a data processing system for facilitating communications between a plurality of other data processing systems, comprising the steps of:
- receiving a request in a system independent format from a first data processing system via only a wireless communication link, wherein the system independent format is at least one of a Java based language or an extensible markup language;
- broadcasting the request to a second data processing system via only the wireless communication link;
- receiving an answer in a system independent format from the second data processing system via only the wireless communication link; and
- broadcasting the answer to the first data processing system via only the wireless communication link, wherein transmissions between each of the data processing systems are at least one of infrared transmissions or radio frequency transmissions.

24. The method recited in claim 23, wherein the transmissions between each of the data processing systems are encrypted.

25. A computer program product in a computer readable media for use in a data processing system for facilitating communications between a plurality of other data processing systems, the computer program product comprising:
- first instructions for receiving a request in a system independent format from a first data processing system via only a wireless communication link, wherein the system independent format is at least one of a Java based language or an extensible markup language;
- second instructions for broadcasting the request to a second data processing system via only the wireless communication link;
- third instructions for receiving an answer in a system independent format from the second data processing system via only the wireless communication link; and
- fourth instructions for broadcasting the answer to the first data processing system via only the wireless communication link, wherein transmissions between each of the data processing systems are at least one of infrared transmissions or radio frequency transmissions.

26. The computer program product recited in claim 25, wherein the transmissions between each of the data processing systems are encrypted.

27. A system in a data processing system for facilitating communications between a plurality of other data processing systems, comprising:
- means for receiving a request in a system independent format from a first data processing system via only a wireless communication link, wherein the system independent format is at least one of a Java based language or an extensible markup language;
- means for broadcasting the request to a second data processing system via only the wireless communication link;
- means for receiving an answer in a system independent format from the second data processing system via only the wireless communication link; and
- means for broadcasting the answer to the first data processing system via only the wireless communication link, wherein transmissions between each of the data processing systems are at least one of infrared transmissions or radio frequency transmissions.

28. The system recited in claim 27, wherein the transmissions between each of the data processing systems are encrypted.

* * * * *